(12) United States Patent
Furber (10) Patent No.: US 8,289,971 B2
(45) Date of Patent: Oct. 16, 2012

(54) DATA TRANSMISSION METHOD (75) Inventor: Stephen Byram Furber, Wilmslow (GB)

(73) Assignee: Cogniscience Limited, Manchester (GB)

( * ) Notice: Subject to any disclaimer, the term of this patent is extended or adjusted under 35 U.S.C. 154(b) by 507 days.

(21) Appl. No.: 12/094,901

(22) PCT Filed: Nov. 21, 2006

(86) PCT No.: PCT/GB2006/004312
§ 371 (c)(1),
(2), (4) Date: May 23, 2008

(87) PCT Pub. No.: WO2007/060400
PCT Pub. Date: May 31, 2007

(65) Prior Publication Data
US 2008/0267188 A1 Oct. 30, 2008

(30) Foreign Application Priority Data
Nov. 26, 2005 (GB) .................................. 0524126.0

(51) Int. Cl.
*H04L 12/28* (2006.01)
*H04L 12/56* (2006.01)
*G06F 13/00* (2006.01)
*G06F 13/28* (2006.01)

(52) U.S. Cl. ............. 370/395.32; 370/389; 370/395.31; 370/392; 707/747; 707/758; 707/791; 707/793; 711/108; 711/216; 711/220; 711/221; 380/264

(58) Field of Classification Search .................. 370/235, 370/389, 392, 395.3, 395.31, 395.32; 707/706, 707/747, 758, 781, 791, 793, 800; 711/104, 711/105, 108, 212, 216, 220, 221; 713/168, 713/171; 380/264
See application file for complete search history.

(56) References Cited

U.S. PATENT DOCUMENTS

| 5,181,017 | A  | * | 1/1993  | Frey et al. ..................... 709/239 |
| 5,396,470 | A  | * | 3/1995  | Storn ........................ 365/230.01 |
| 5,414,704 | A  | * | 5/1995  | Spinney ........................ 370/389 |
| 5,909,440 | A  | * | 6/1999  | Ferguson et al. ............. 370/389 |
| 6,212,183 | B1 | * | 4/2001  | Wilford ........................ 370/392 |
| 6,240,003 | B1 | * | 5/2001  | McElroy ....................... 365/49.1 |
| 6,639,819 | B2 | * | 10/2003 | Uzawa et al. ............... 365/49.17 |
| 7,017,089 | B1 | * | 3/2006  | Huse ............................. 714/718 |
| 7,126,946 | B2 | * | 10/2006 | Beadle et al. ................. 370/390 |
| 7,213,101 | B1 | * | 5/2007  | Srinivasan et al. ............ 711/108 |

(Continued)

FOREIGN PATENT DOCUMENTS
EP 0 410 568 A2 1/1991
(Continued)

OTHER PUBLICATIONS

International Search Report and Written Opinion of the International Searching Authority for International Application No. PCT/GB2006/004312, mailed Apr. 5, 2007, 11 pages.

(Continued)

*Primary Examiner* — Michael Thier
*Assistant Examiner* — Benjamin H Elliott (57) ABSTRACT

A method of transmitting data between a plurality of interconnected elements. The method comprises receiving a message from a first element, said message comprising a routing key plus optionally a data payload. The routing key is processed to identify a plurality of said inter-connected elements, and data is transmitted to said identified plurality of inter-connected elements.

15 Claims, 5 Drawing Sheets

U.S. PATENT DOCUMENTS

| | | | |
|---|---|---|---|
| 7,228,378 B1 * | 6/2007 | Pereira | 711/108 |
| 7,260,675 B1 * | 8/2007 | Bhugra et al. | 711/108 |
| 7,325,239 B2 * | 1/2008 | Hariharan et al. | 719/328 |
| 7,389,359 B2 * | 6/2008 | Jain et al. | 709/238 |
| 7,409,526 B1 * | 8/2008 | Ng et al. | 711/216 |
| 7,451,288 B2 * | 11/2008 | Goettfert et al. | 711/164 |
| 7,512,572 B2 * | 3/2009 | Furber | 706/15 |
| 7,634,500 B1 * | 12/2009 | Raj | 1/1 |
| 7,739,445 B1 * | 6/2010 | Venkatachary | 711/108 |
| 7,783,654 B1 * | 8/2010 | Sreenath | 707/758 |
| 2003/0007489 A1 * | 1/2003 | Krishnan et al. | 370/392 |
| 2003/0028713 A1 * | 2/2003 | Khanna et al. | 711/108 |
| 2004/0008675 A1 | 1/2004 | Basso et al. | |
| 2004/0083336 A1 * | 4/2004 | Stark et al. | 711/105 |
| 2004/0233692 A1 * | 11/2004 | Ao | 365/49 |
| 2005/0102685 A1 * | 5/2005 | Hariharan et al. | 719/328 |
| 2006/0064413 A1 * | 3/2006 | Uzawa et al. | 707/3 |
| 2007/0171911 A1 * | 7/2007 | Ku | 370/392 |
| 2008/0267188 A1 * | 10/2008 | Furber | 370/392 |

FOREIGN PATENT DOCUMENTS

| | | |
|---|---|---|
| EP | 0 993 144 A2 | 4/2000 |
| JP | 2000-332752 A | 11/2000 |
| WO | 99/00949 A | 1/1999 |
| WO | WO 02/19624 A2 | 3/2002 |
| WO | 03/036503 A | 5/2003 |
| WO | WO 03083669 A2 * | 10/2003 |

OTHER PUBLICATIONS

Search Report under Section 17(5) for Application No. GB 0524126.0, dated Apr. 10, 2006, 3 pages.

Office Action for European Patent Application No. 06808598.4, mailed on May 26, 2010; 7 pages.

Office Action for Chinese Patent Application No. 200680043232.9, mailed on Oct. 13, 2010; 3 pages.

Office Action for Japanese Patent Application No. 2008-541807, mailed on Mar. 22, 2011; 2 pages.

* cited by examiner

DATA TRANSMISSION METHOD

The present application claims priority under 35. U.S.C. §371 and is a national phase application of International Patent Application No. PCT/GB2006/004312, filed Nov. 21, 2006, which is hereby incorporated by reference in its entirety and which claims priority to UK Patent Application No. 0524126.0, filed Nov. 26, 2005.

The present invention relates to a data transmission method and apparatus.

Conventional computer networks typically support two modes of communication. A first mode of communication is one-to-one communication. Here a message is carried from a single source to a signal destination. A second mode of communication is broadcast communication. Here a message is carried from a single source to all other elements connected to a network.

In neural systems of interconnected neurons, neurons typically have very high connectivity with one another. It is often the case that a given neuron accepts data from between 1,000 and 10,000 other neurons, and outputs data to a similar number of neurons. Neither of the two modes of communication described above is ideally suited to neural systems. If one-to-one communication is used, a large number of messages need to be sent. Specifically, if one neuron is to transmit data to 1,000 other neurons, 1,000 messages would be required. If broadcast communication is used, a message will be transmitted to all other neurons. This is again undesirable, as messages will be sent to more destinations than is necessary, and valuable bandwidth will be wasted.

Instead, a multi-cast communication mechanism would be preferable. In multi-cast communication a message is transmitted from a single source to multiple recipients, but not to all possible recipients. Multicast communication is particularly attractive in neural systems, although current multicast communications techniques are not ideally suited to neural applications.

It is an object of the present invention to obviate or mitigate at least some of the problems outlined above.

According to the present invention, there is provided a method of transmitting data between a plurality of inter-connected elements, the method comprising: receiving a message from a first element, said message comprising a routing key, processing said routing key to identify a plurality of said inter-connected elements; and transmitting data to said identified plurality of inter-connected elements, wherein processing said routing key comprises attempting to locate a routing word by performing a look up operation using said routing key, said plurality of said inter-connected elements being identified using said routing word.

Thus, the invention provides a method of transmitting data in which elements to which data is transmitted are selected on the basis of a routing key received within a message. For example, the routing key may tale the form of an identifier of an element transmitting the message, and in such circumstances the identity of the element transmitting the message is therefore used to determine the elements to which data is transmitted.

The data transmitted to the identified plurality of interconnected elements may comprise the received message. Indeed, the data transmitted may be identical to the received message. The received message may comprise a data payload. However, it is to be noted that in neural embodiments of the invention, the received message typically contains only a routing key which is considered to be a neural "spike" and no further data is therefore required.

Processing the routing key may comprise attempting to locate a routing word by performing a lookup operation using the routing key. The identified plurality of interconnected elements may then be selected using the routing word. If the attempting is unsuccessful, default data may then be used to determine elements to which data is transmitted. Specifically, at least one interconnected element may be identified using default data.

The routing word may have a bit for each of the connected elements, and the state of a respective bit may determine whether the data is communicated to one of the interconnected elements. That is, where the method of transmitting data is carried out at an element connected to N further elements, an N-bit routing word may be used, each bit representing one of the N elements. The lookup operation may comprise comparing the routing key with keys associated with the respective routing words. The routing key may comprise a plurality of bits, and any subset of those bits may be used in at least some of the comparison operation. The bits to be used may be determined for each of the keys independently. That is, each of the keys may have an associated mask which is used to ensure that only certain bits of the routing key are used in the lookup operation. The mask may be combined with the routing key using a bit-wise logical AND operation.

In preferred embodiments of the invention, the first element and the identified plurality of interconnected elements are connected to a second element, and the method is carried out at the second element.

The method above may be implemented in hardware.

The invention further provides a data carrier carrying computer readable program code configured to cause a computer to carry out the methods set out above. There is also provided a computer apparatus comprising a program memory storing processor readable instructions and a processor configured to read and execute instructions stored in the program memory. The processor readable instructions comprise instructions controlling the processor to carry out a method as set out above.

According to a further aspect of the present invention, there is provided an apparatus for transmitting data between a plurality of interconnected elements. The apparatus comprises means for receiving a message from first element, the message comprising a routing key, means for processing the routing key to identify a plurality of the interconnected elements by attempting to locate a routing word by performing a look up operation using said routing key, said plurality of said inter-connected elements being identified using said routing word, and means for transmitting data to the identified plurality of interconnected elements.

The invention also provides apparatus for transmitting data between a plurality of inter-connected elements, the apparatus comprising: a receiver interface configured to receive a message from a first element, said message comprising a routing key, a processor configured to identify a plurality of said inter-connected elements using said routing key by attempting to locate a routing word by performing a look up operation using said routing key, said plurality of said inter-connected elements being identified using said routing word, and a transmitter interface configured to transmit data to said identified plurality of inter-connected elements.

Preferably, the apparatus comprises an associative memory in communication with RAM. Data stored in the associative memory may be used to identify the plurality of interconnected elements. Having used said associative memory in this way, a routing word may then be located in the RAM.

A further aspect of the invention provides a network of interconnected elements, the networks being configured to transmit data between one another. Each element comprises a router, and the router is configured to: receive a message from a first element, the message comprising a routing key, process the routing key to identify a plurality of the interconnected elements by attempting to locate a routing word by performing a look up operation using said routing key, said plurality of said inter-connected elements being identified using said routing word, and transmit data to the identified plurality of interconnected elements.

Embodiments of the present invention will now be described, by way of example only, with reference to the accompanying drawings, in which.

Figure 1:
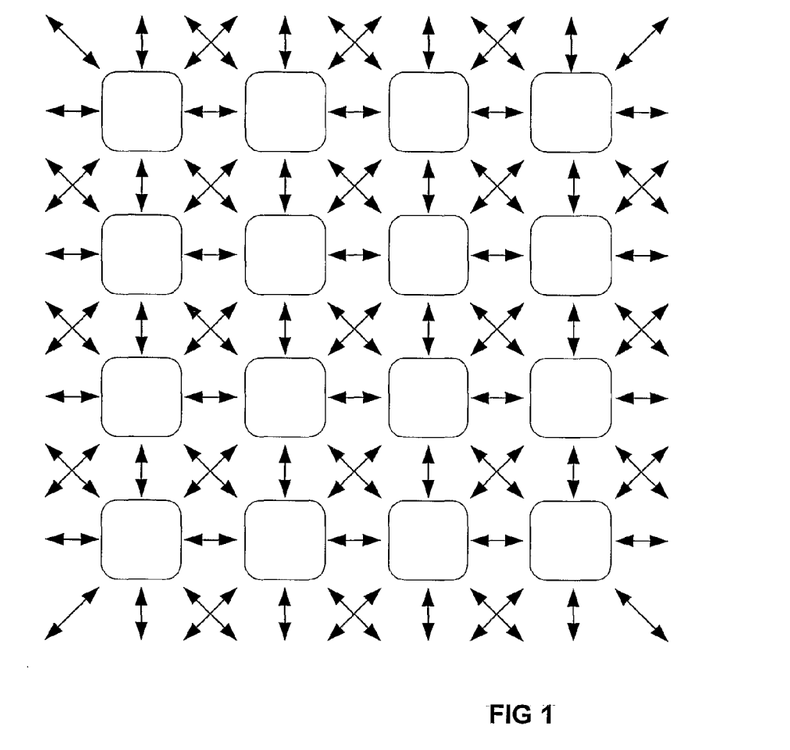
FIG. 1 is a schematic illustration of a network of interconnected elements in which the present invention may be implemented.
Figure 2:
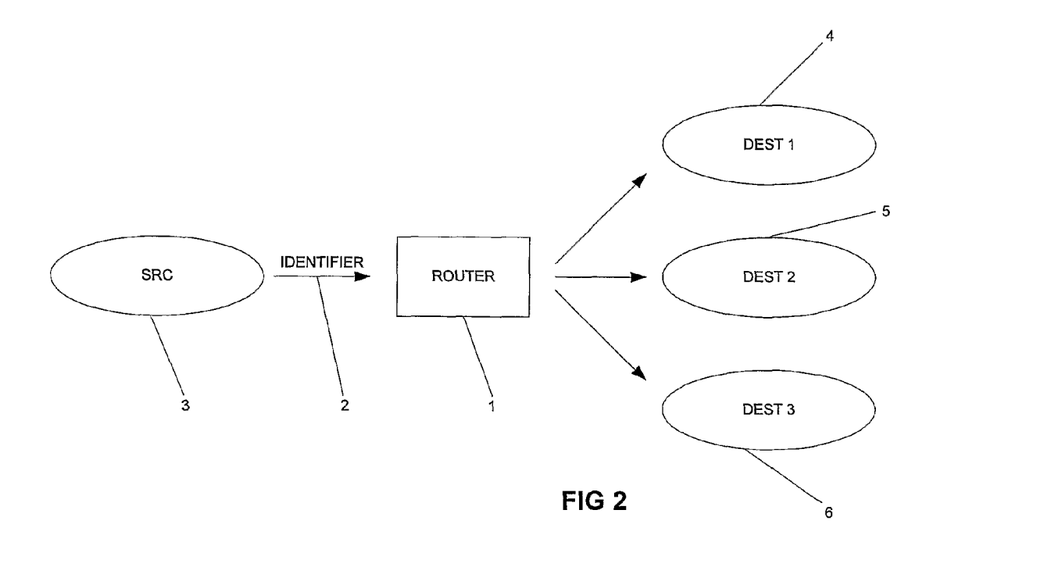
FIG. 2 is a schematic illustration showing operation of a router included in one of the elements of FIG. 1.

Referring first to FIG. 1, there are illustrated sixteen interconnected elements which form part of a larger network. It can be seen that each of the elements is connected to its eight nearest neighbours by direct communications links. Each of the elements of FIG. 1 is configured to receive a message from any of its interconnected elements and to generate data for transmission to one or more of the elements to which it is connected. Transmission of data between the interconnected elements is managed by routers included within each of the interconnected elements. The routers operate by processing a routing key received within a message, and determining from this routing key to which of the elements data should be transmitted. For example, in preferred embodiments of the invention this routing key comprises an identifier of the element transmitting the message. This identifier is processed to identify the elements to which data should be transmitted. This is schematically illustrated in FIG. 2. Here it can be seen that a router 1 receives an identifier 2 from a source element 3. The router 1 processes the identifier 2 to identify three destination elements 4, 5, 6. Having identified the destination elements 4, 5, 6 the router 1 then transmits data in the form of appropriate messages to the destination elements 4, 5, 6. Thus, in this way, the routing of data by the router 1 is determined by the identifier 2 of the source element 3 from which the router 1 receives a message.

Figure 3:
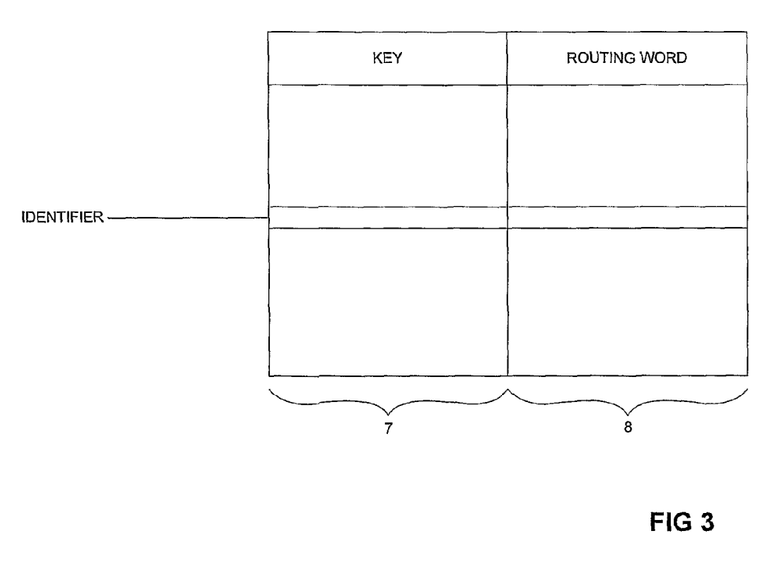
FIG. 3 is a schematic illustration of a lookup table used by the router of FIG. 2.

The router 1 carries out routing operations using a routing table of the type shown schematically in FIG. 3. The table comprises a plurality of look up keys 7, against which the received identifier 2 is compared. If the received identifier matches one of the keys 7, a corresponding routing word 8 is retrieved and used to determine the appropriate elements to which data should be transmitted. Each of the routing words 8 is a binary number having a predetermined number of bits, each bit representing a link to another element. That is, in the example of FIG. 1 each routing word is an 8-bit number, the eight bits representing the eight communication links of each element. It will however be appreciated that in many embodiments of the invention, each element will have more than eight communication links, and each routing word will therefore comprise more bits. If a particular bit of the routing word is set to '1' that indicates that data should be transmitted on the communications link represented by that bit. Conversely, if a particular bit of the routing word is set to '0', this indicates that data should not be transmitted on the communications link represented by that bit.

Routing as described above effectively allows multi-cast communication in which the element from which a message is received determines elements to which data is transmitted. However, where a very large network of interconnected elements is used, the routing table shown in FIG. 3 will be very large. Thus, where each of the elements of FIG. 1 is to be implemented as a single chip, it might be impossible or at least very expensive to fit the routing table onto the chip. Various optimisations are therefore possible. For example, it should be noted that the routing table included in a router at any element of the network need only include entries for keys which are associated with identifiers whose routes from their source to all their destinations pass through, are generated in, or end at that element.

Additionally or alternatively, each element may implement default routing in the case that the look up table of FIG. 3 fails to provide a match for a particular identifier. For example, when an identifier included within a message does not match any of the keys in the table of FIG. 3, data may simply be transmitted to a single element on the diametrically opposite link to that on which the message is received.

Furthermore, groups of message identifiers will often need to be handled in the same way. That is, messages received from a plurality of elements may all need to generate data transmissions to the same set of elements within the network. This can be achieved by effectively ignoring some bits of the message identifier when performing the look up operation. That is, some bits of the message identifier are treated as "don't care" bits in the look up operation. An embodiment using such "don't care" bits is now described with reference to FIG. 4.

Figure 4:
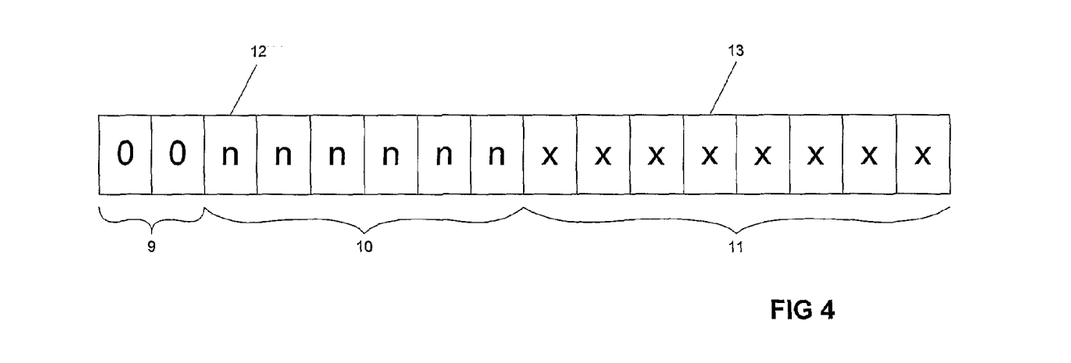
FIG. 4 is a schematic illustration of a routing key used in connection with the lookup table of FIG. 3.

Referring to FIG. 4, a sixteen bit routing key is illustrated. The sixteen bits form three logical components. A first component 9 comprises two bits which indicate that the sixteen bits together represent routing data of a particular type. In one embodiment these bits have a value '00' where the routing table of FIG. 3 is to be used to effect multicast communication as described above. Values of '01', '10' and '11' are respectively used to indicate one-to-one routing in which the remaining fourteen bits represent an address to which data should be transmitted, broadcast routing in which the remaining fourteen bits are not required, and some other routing algorithm implemented by the router.

Second and third components 10, 11 of the routing key are, when the first component has the value '00' used to perform routing by carrying out a lookup operation using the lookup table of FIG. 3. However, in the described embodiment of the invention, only six bits making up the second component 10 are used in the look up operation, with the remaining eight bits making up the third component 11 being ignored for routing purposes in the present router. That is, it is only bits of the second component 10 that determine the elements to which data is transmitted, with the bits of the third component 11 being used to determine further routing as appropriate at a further element in the network. Bits of the third component 11 may be partially processed using a more detailed lookup table at subsequent elements in the network, or alternatively may be processed by software at such subsequent elements.

It can be seen that the optimisation of the routing table of FIG. 3 to take into account only the second component 10 (and not the third component 11) when carrying out routing operations, provides considerable benefits. In this relatively small example, a routing table which would otherwise need 16,384 entries (that is $2^{14}$) instead requires 64 entries (that is $2^6$).

In the illustration of FIG. 4, it can be seen that six adjacent bits form the second component 10, while eight adjacent bits form the third component 11. There is no need for these second and third components to be made up from adjacent bits. For example, it may be decided that the most significant bit 12 of the second component 11 can also be ignored when performing look up operations. In such a case, the most significant bit 12 would become part of the third component 11, and would not be used during look up operations. Similarly, it may be that a bit 13 needs to be taken into account in the lookup operations, and accordingly, the bit 13 would then become part of the second component 10. That is, in general terms, in order to reduce the size of the routing table only some bits of the identifier are taken into account, and the bits that are and are not taken into account can be located anywhere within the routing key.

The router 1 comprising the lookup table of FIG. 3 is now described in further detail. It should be noted that in general terms, the router is an associative (content-addressed) memory, with programmable masking on a per-entry basis so as to correctly process the second and third components 10, 11 of a routing key as described above. This associative memory is connected to a conventional memory which holds routing words used to carry out routing operations. The associative memory can be implemented using any conventional technique such as VLSI CAM cells or hash-addressed RAM.

Figure 5:
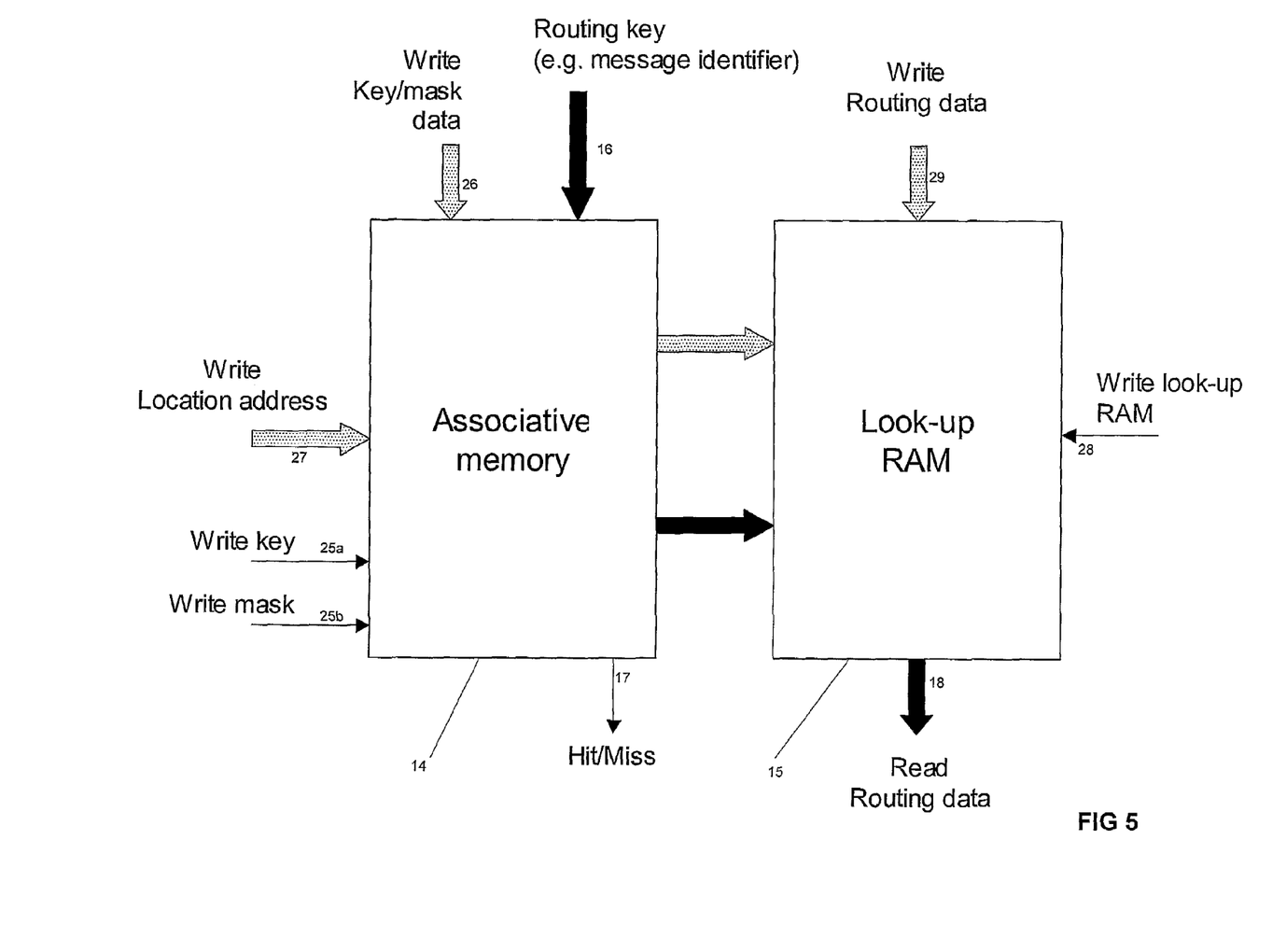
FIG. 5 is a schematic illustration showing the structure of the router of FIG. 2 in further detail.

The structure of the router is now described with reference to FIGS. 5 and 6. Referring to FIG. 5, as described above, it can be seen that the router 3 comprises an associative memory 14 and lookup RAM 15. In general terms a routing key of the type described above is presented to the associative memory as indicated by an arrow 16. The associative memory then carries out a look up operation by comparing each of the keys of the associative memory with the presented routing key. The hit or miss generated by this operation is output by the associative memory as indicated by an arrow 17. If a hit is generated, an appropriate routing word is obtained from the lookup RAM 15 and output as is indicated by an arrow 18.

The structure of the router 1 and its operation is now described in further detail with reference with FIG. 6, which illustrates two entries of the associative memory 14 and two corresponding entries of the lookup RAM 15. A first entry of the associative memory comprises a mask 19, mask gating 20, a key 21 and a comparator 22. A routing key (e.g. the identifier of a source element as discussed above) is provided as indicated by the arrow 18 is passed to the mask gating 20, along with the mask 19. The mask gating 20 is a collection of AND gates which perform a bit-wise AND operation between the provided routing key and the mask 19.

The mask 19 is configured so as to correctly handle "don't care" bits of the routing key. For example, if the routing key has the form shown in FIG. 4, where the fourteen least significant bits form an operative part of the routing key, then a fourteen bit mask of the form 11111100000000 is provided. It can be seen that performing a logical bitwise AND operation between this mask and the routing key of FIG. 4 will preserve the state of the six most significant bits of the operative part routing key, while setting the eight least significant bits to '0'. By ensuring that the key 21 also has its eight least significant bits set to '0' this effectively implements the desired "don't care" policy.

The result of the bit-wise AND operation carried out by the mask gating 20 is output to the comparator 22 along with the key 21 associated with that entry of the associative memory. If the comparison is successful, routing data 23 stored in the lookup RAM 15 and associated with the described entry of the associative memory is read and output as indicated by the arrow 18.

Figure 6:
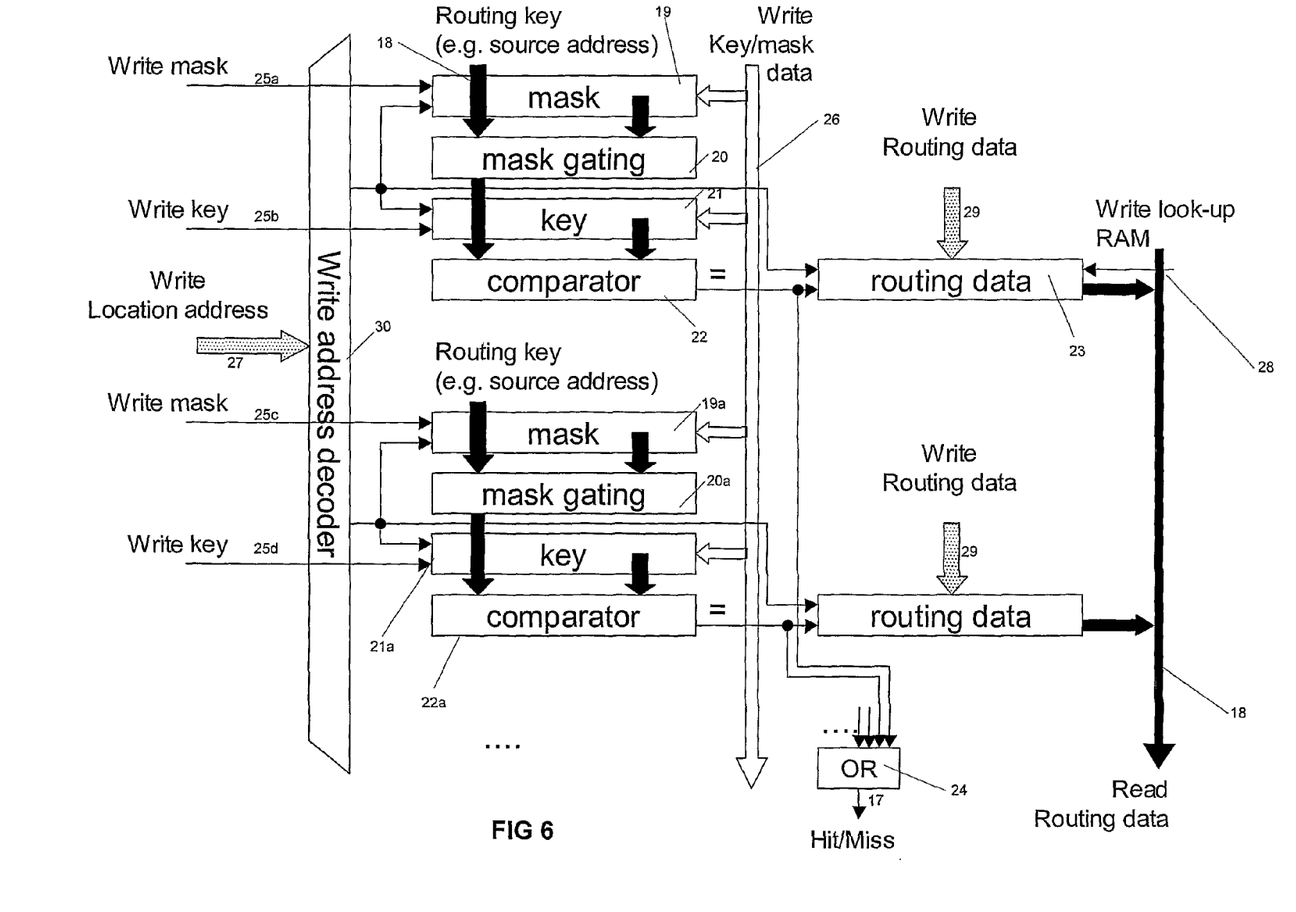
FIG. 6 is a schematic illustration showing the structure of the router of FIG. 5 in yet further detail.

The preceding description of FIG. 6 has been concerned with a single entry of the associative memory 14 and an associated entry of the lookup RAM 15. A further entry of the associative memory 14 comprising a mask 19a, mask gating 20a, a key 21a and a comparator 22a is also shown in FIG. 6. However it will be appreciated that the associative memory will in practice contain a large number of further entries having the same structure. It can be seen from FIG. 6 that if any of the comparators 22, 22a generates a hit, its output is passed to an OR gate 24, which generates hit/miss data as indicated by the arrow 17. That is, if there is one successful comparison, the respective comparator will pass a '1' to the OR gate 24, and accordingly the output 17 will '1' indicating a hit. If none of the comparators outputs a '1', the output of the OR gate 24 will be '0'. The hit/miss output indicated by the arrow 17 can be used to trigger default routing behaviour in the case of a miss, as described above.

The preceding description of FIGS. 5 and 6 has been concerned with location of data appropriate to a particular routing key. It will be appreciated that before such processing can be carried out, the associative memory must be properly configured so as to store appropriate data. Such a process is now described, first with reference to FIG. 5. In general, control signals denoted by arrows 25a, 25b indicate whether a key or mask is to be written to the associative memory, and appropriate data is then presented as denoted by an arrow 26. The presented data is written to an address of the associative memory 14 determined by address data denoted by an arrow 27. The address data denoted by the arrow 27 further identifies an entry of the lookup RAM 18, meaning that a suitable control signal denoted by an arrow 28 can be provided to allow data (in the form of a routing word) denoted by an arrow 29 to be written to the look-up RAM 15.

The write arrangement of FIG. 5 is shown in further detail in FIG. 6. Here it can be seen that the address denoted by the arrow 27 is passed to a write address decoder 30 which selects an appropriate entry of the associative memory 14. Each element of the associative memory 14 receives control signals denoted 25a, 25b, 25c, 25d to indicate whether key data or mask data is to be written. The data to be written is then provided to an appropriate element of the associative memory by being provided as denoted by the arrow 26, and stored at whichever element of the associative memory is currently write enabled.

It can further be seen from FIG. 6 that the write address decoder 30 selects an element of the lookup RAM 18 to which routing data provided as denoted by arrows 29 is to be written.

In FIG. 6, the router is shown to have a single write address decoder for both the associative memory 14 and the lookup RAM 15. This need not be the case. For example, given that in the case of a hit, exactly one of the comparators will generate a bit for the presented routing key, the collective output of the comparators will be a 1-of-N code (that is, exactly one bit will be set to '1' with N-1 bits being set to '0'). This 1-of-N code can then be used to address the lookup RAM 15 in an efficient manner.

Referring again to FIG. 6, it should be noted that the provision of a mask for each entry of the associative memory allows different "don't care" policies to be implemented for different entries of the associative memory. In alternative embodiments of the invention, a single "don't care" policy may be applied to all entries of the associative memory. In such embodiments a single mask is stored and passed to the mask gatings of all entries.

Figure 7:
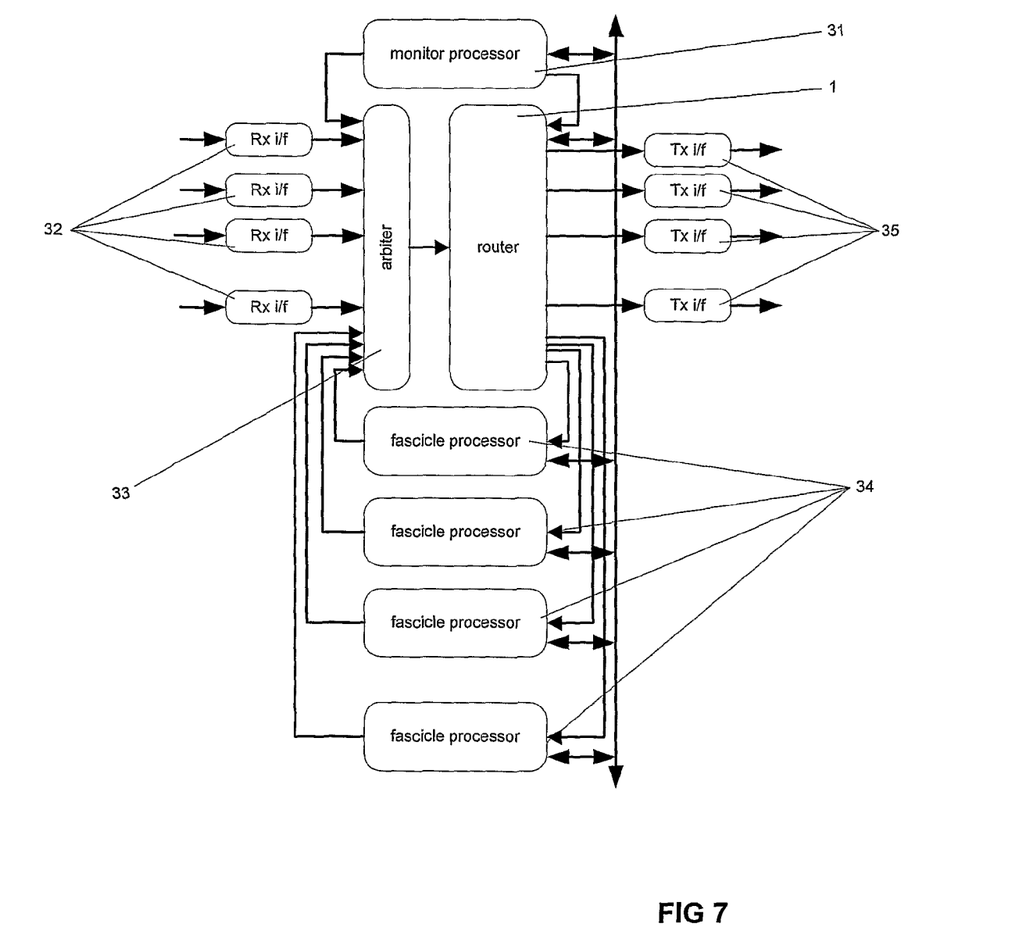
FIG. 7 is a schematic illustration of a possible architecture for the elements of FIG. 1.

The preceding description has been concerned with a router routing data between elements in a network of interconnected elements. However the invention is also applicable to routing within elements. For example, referring now to FIG. 7, a suitable structure for one of the elements shown in FIG. 1 is shown. It can be seen that in addition to the router 1, the illustrated element comprises a monitor processor 31 which is responsible for overall management of the element. Additionally a receiver interface 32 is provided for each communications link along which messages are received (that is eight receiver interfaces will be provided in each element of the network of FIG. 1). The receiver interfaces 32 pass data to an arbiter 33 which is responsible for presenting messages received from the receiver interfaces 32 to the router 1. The order in which messages are passed to the router is determined by the arbiter 33, but given that messages are routed independently, the order in which messages are passed is of little significance. The router 1 then carries out routing in the manner described above, routing data either to fascicle processors 34 within the element or to transmitter interfaces 35. It should be noted that each of the fascicle processors 34 are configured to implement a plurality of neurons (known as a bundle) which form part of a neural network. However the processors 34 can take any suitable form, and need not implement a plurality of neurons. One transmitter interface 35 is provided for each communications link on which data may be transmitted (that is eight transmitter interfaces will be provided in each element of the network of FIG. 1). Thus, it can be seen that the router 1 routes data both to processors within the illustrated element, as well as to other elements within the network. The fascicle processors 34 can generate messages that are handled by the router 1 in the same way as messages that are received from interconnected elements.

Routing and communication methods in accordance with the present invention have particular applicability in neural systems in which neurons communicate with one another. Such systems require efficient multi-cast communication of the type provided by the present invention. Such systems can be implemented using elements having the form shown in FIG. 7, where each of the fascicle processors 34 included within each element implements a plurality of neurons as described above. It will be appreciated that in such a circumstance each neuron may have a respective identifier. These neuron identifiers can then be used as routing keys. Indeed, it will be appreciated that routing keys can take any convenient form. That is, routing keys can take the form of identifiers of neurons, processors or elements. Indeed in alternative embodiments of the invention other routing keys are used.

It will be appreciated that the routing tables used in embodiments of the present invention must be defined. Routing tables may be configured using external software. For example, in neural implementations of the invention neural netlists are provided describing neuron interconnections, and neurons are then mapped onto processors to determine routing table entries. This is a similar process to FPGA configuration. Resource constraints such as routing table size and bandwidth limitations must be taken into account during the mapping process. When a suitable routing table is generated it can then be written using a method as described with reference to FIG. 6.

For static applications, the routing table is fixed. However, it is possible to allow local processors to modify routing tables while the system is running. This allows developmental processes to be modelled, for example in neural based systems. Changes to routing tables during system operation must, of course, be carried out with care to ensure that desired routings are always obtained.

Preferred embodiments of the present invention have been described above. It will however be appreciated that various modifications can be made to such embodiments without departing from the spirit and scope of the invention, as defined by the appended claims. For example, the invention has been described such that an identifier of an element from which a message emanates is used to determine routing. This need not be the case. The element from which the message emanates can provide any suitable data within the message to be used as the routing key in the lookup operation.

Additionally, the illustration of FIG. 1 shows a two-dimensional arrangement of elements in which each element is connected to its eight nearest neighbours. It will however be appreciated that many other configurations are possible. For example, three-dimensional arrangements can be used, and indeed, in a network in which each element has eight connections, a four-dimensional hypercube interconnection fabric can be used.

The invention claimed is:

1. A method of transmitting a message between a plurality of inter-connected elements, the method comprising:
    receiving said message from a first element, said message comprising only a routing key;
    processing said routing key to identify an identified plurality of said plurality of inter-connected elements, the plurality of interconnected elements being configured to implement a plurality of neurons that form part of a neural network; and
    transmitting said message to said identified plurality of said plurality of inter-connected elements;
    wherein processing said routing key comprises attempting to locate a routing word by performing a look up operation using said routing key, and said look up operation comprises comparing said routing key with a plurality of keys associated with respective routing words, the routing key comprising a plurality of bits, and only a subset of said plurality of bits being used in at least some of said comparisons, said plurality of bits to be used for a comparison being determined for each key from said plurality of keys based upon a respective mask associated with that key, the identified plurality of said plurality of inter-connected elements being identified using said located routing word, wherein said routing word has a bit for each of the identified plurality of said plurality of inter-connected elements connected to a particular one of said plurality of inter-connected elements.

2. The method according to claim 1, wherein said subset of said plurality of bits is determined for each key from said plurality of keys independently.

3. The method according to claim 1, wherein selecting said subset of said plurality of bits comprises setting bits of said routing key other than said subset of said plurality of bits to a predetermined state, before performing said comparisons.

4. The method according to claim 3, wherein setting bits of said routing key comprises performing a bit-wise logical AND operation between said routing key and a predetermined mask.

5. The method according to claim 1, wherein said routing key comprises an identifier of said first element.

6. The method according to claim 1, further comprising identifying at least one interconnected element from said plurality of inter-connected elements using default data when said attempting is unsuccessful.

7. The method according to claim 1, wherein said first element and said identified plurality of said plurality of inter-connected elements are connected to a second element, and said method is carried out at said second element.

8. A tangible carrier medium carrying computer readable program code configured to cause a computer to carry out a method according to claim 1.

9. A computer apparatus comprising:
- a program memory storing processor readable instructions; and
- a processor configured to read and execute instructions stored in said program memory;
- wherein said processor readable instructions comprise instructions controlling the processor to carry out a method according claim 1.

10. An apparatus for transmitting data between a plurality of inter-connected elements, the apparatus comprising:
- a receiver interface configured to receive a message from a first element, said message comprising only a routing key;
- a processor configured to identify an identified plurality of said plurality of inter-connected elements by attempting to locate a routing word by performing a look up operation using said routing key, said plurality of inter-connected elements being configured to implement a plurality of neurons that form part of a neural network, the look up operation comprising comparing said routing key with a plurality of keys associated with respective routing words, the routing key comprising a plurality of bits, and only a subset of said plurality of bits being used in at least some of said comparisons, said plurality of bits to be used for a comparison being determined for each key from said plurality of keys based upon a respective mask associated with that key, the identified plurality of said plurality of inter-connected elements being identified using said routing word, wherein said routing word has a bit for each of the identified plurality of said plurality of inter-connected elements connected to a particular one of said plurality of inter-connected elements; and
- a transmitter interface configured to transmit only said routing key to said identified plurality of said plurality of inter-connected elements.

11. The apparatus according to claim 10, wherein said processor is configured to identify said identified plurality of said plurality of inter-connected elements on the basis of data stored in an associative memory.

12. The apparatus according to claim 11, wherein said associative memory is configured to locate a routing word stored in associated RAM.

13. The apparatus according to claim 10 wherein said associative memory comprises a plurality of entries, each entry from said plurality of entries comprising a key from said plurality of keys, and said processor is configured to identify said identified plurality of said plurality of inter-connected elements using said plurality of keys.

14. The apparatus according to claim 13, wherein each entry of said associative memory further comprises a mask, and said routing key is combined with said mask to identify said identified plurality of said plurality of inter-connected elements.

15. A network of inter-connected elements, the elements being configured to transmit data between one another, each element comprising a router, the router being configured to:
- receive a message from a first element, said message comprising a routing key;
- process said routing key to identify a plurality of said inter-connected elements by attempting to locate a routing word by performing a look up operation using said routing key, the plurality of said inter-connected elements configured to implement a plurality of neurons that form part of a neural network, the look up operation comprising comparing said routing key with a plurality of keys associated with respective routing words, the routing key comprising a plurality of bits, and only a subset of said plurality of bits being used in at least some of said comparisons, the bits of the routing key to be used for a comparison being determined for each key based upon a respective masks associated with the key, said plurality of bits to be used for a comparison being determined for each key from the plurality of keys based upon a respective mask associated with that key, the identified plurality of said plurality of inter-connected elements being identified using said routing word, wherein said routing word has a bit for each of the identified plurality of inter-connected elements connected to a particular one of said plurality of inter-connected elements; and
- transmit data to said identified plurality of said plurality of inter-connected elements.

\* \* \* \* \*